(12) United States Patent
Eiden

(10) Patent No.: US 10,699,133 B2
(45) Date of Patent: *Jun. 30, 2020

(54) SYSTEMS AND METHODS FOR OPERATION OF A VEHICLE

(71) Applicant: CSAA Insurance Services, Inc., Walnut Creek, CA (US)

(72) Inventor: Steven Donald Eiden, Antioch, CA (US)

(73) Assignee: CSAA Insurance Services, Inc., Walnut Creek, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/290,824

(22) Filed: Mar. 1, 2019

(65) Prior Publication Data

US 2019/0197320 A1 Jun. 27, 2019

Related U.S. Application Data

(63) Continuation of application No. 15/723,995, filed on Oct. 3, 2017, now Pat. No. 10,262,212.

(51) Int. Cl.
*G06K 9/00* (2006.01)
(52) U.S. Cl.
CPC .......... *G06K 9/00791* (2013.01); *G06T 2207/30252* (2013.01)
(58) Field of Classification Search
None
See application file for complete search history.

(56) References Cited

U.S. PATENT DOCUMENTS

| | | |
|---|---|---|
| 6,121,896 A | 9/2000 | Rahman |
| 7,365,769 B1 | 4/2008 | Mager |
| 9,317,757 B2 | 4/2016 | Winter et al. |
| 10,262,212 B1 * | 4/2019 | Eiden ................ G06K 9/00791 |
| 2006/0125617 A1 | 6/2006 | Zimmermann |
| 2009/0091440 A1 | 4/2009 | Roman |
| 2009/0256698 A1 | 10/2009 | Bonilla |
| 2014/0195113 A1 | 7/2014 | Lu et al. |
| 2014/0240487 A1 | 8/2014 | Nonaka et al. |
| 2016/0207533 A1 | 7/2016 | Uechi et al. |

FOREIGN PATENT DOCUMENTS

WO 2008146304 12/2008

* cited by examiner

*Primary Examiner* — Justin P. Misleh
(74) *Attorney, Agent, or Firm* — McDonnell Boehnen Hulbert & Berghoff LLP

(57) ABSTRACT

In one aspect, an example method includes (i) determining, by a computing system at a first time, a first height of a bumper of a leading vehicle relative to a reference height; (ii) determining, by the computing system at a second time that is later than the first time, a second height of the bumper relative to the reference height; (iii) making, by the computing system, a determination that the determined first height and the determined second height lack a threshold extent of similarity based on an established tolerance level; and (iv) responsive at least to making the determination that the determined first height and the determined second height lack the threshold extent of similarity based on the established tolerance level, causing, by the computing system, the light source to operate.

20 Claims, 4 Drawing Sheets

SYSTEMS AND METHODS FOR OPERATION OF A VEHICLE

CROSS-REFERENCE TO RELATED APPLICATION

This application is a continuation of and claims priority to U.S. patent application Ser. No. 15/723,995, filed Oct. 3, 2017, which is hereby incorporated by reference in its entirety.

USAGE AND TERMINOLOGY

In this disclosure, unless otherwise specified and/or unless the particular context clearly dictates otherwise, the terms "a" or "an" mean at least one, and the term "the" means the at least one.

SUMMARY

In one aspect, an example method is disclosed. The method is for use in connection with a following vehicle and a leading vehicle, wherein the following vehicle includes a front end, a rear end, a computing system, and a light source disposed at the rear end, wherein the leading vehicle includes a rear end and a bumper disposed at the rear end of the leading vehicle, and wherein the front end of the following vehicle is oriented towards the rear end of the leading vehicle. The method includes (i) determining, by the computing system at a first time, a first height of the bumper relative to a reference height; (ii) determining, by the computing system at a second time that is later than the first time, a second height of the bumper relative to the reference height; (iii) making, by the computing system, a determination that the determined first height and the determined second height lack a threshold extent of similarity based on an established tolerance level; and (iv) responsive at least to making the determination that the determined first height and the determined second height lack the threshold extent of similarity based on the established tolerance level, causing, by the computing system, the light source to operate.

In another aspect, an example non-transitory computer-readable medium is disclosed. The computer-readable medium has stored thereon program instructions that upon execution by a processor, cause performance of a set of acts for use in connection with a following vehicle and a leading vehicle, wherein the following vehicle includes a front end, a rear end, a computing system, and a light source disposed at the rear end, wherein the leading vehicle includes a rear end and a bumper disposed at the rear end of the leading vehicle, and wherein the front end of the following vehicle is oriented towards the rear end of the leading vehicle. The set of acts include (i) determining, by the computing system at a first time, a first height of the bumper relative to a reference height; (ii) determining, by the computing system at a second time that is later than the first time, a second height of the bumper relative to the reference height; (iii) making, by the computing system, a determination that the determined first height and the determined second height lack a threshold extent of similarity based on an established tolerance level; and (iv) responsive at least to making the determination that the determined first height and the determined second height lack the threshold extent of similarity based on the established tolerance level, causing, by the computing system, the light source to operate.

In another aspect, an example following vehicle is disclosed. The following vehicle includes (i) a front end; (ii) a rear end; (iii) a computing system; and (iv) a light source disposed at the rear end, wherein the front end is oriented towards a rear end of a leading vehicle, wherein the leading vehicle includes a rear end and a bumper disposed at the rear end of the leading vehicle, wherein the front end of the following vehicle is oriented towards the rear end of the leading vehicle, and wherein the computing system is configured for performing a set of acts. The set of acts include (i) determining, by the computing system at a first time, a first height of the bumper relative to a reference height; (ii) determining, by the computing system at a second time that is later than the first time, a second height of the bumper relative to the reference height; (iii) making, by the computing system, a determination that the determined first height and the determined second height lack a threshold extent of similarity based on an established tolerance level; and (iv) responsive at least to making the determination that the determined first height and the determined second height lack the threshold extent of similarity based on the established tolerance level, causing, by the computing system, the light source to operate.

DETAILED DESCRIPTION

I. Overview

Figure 1:
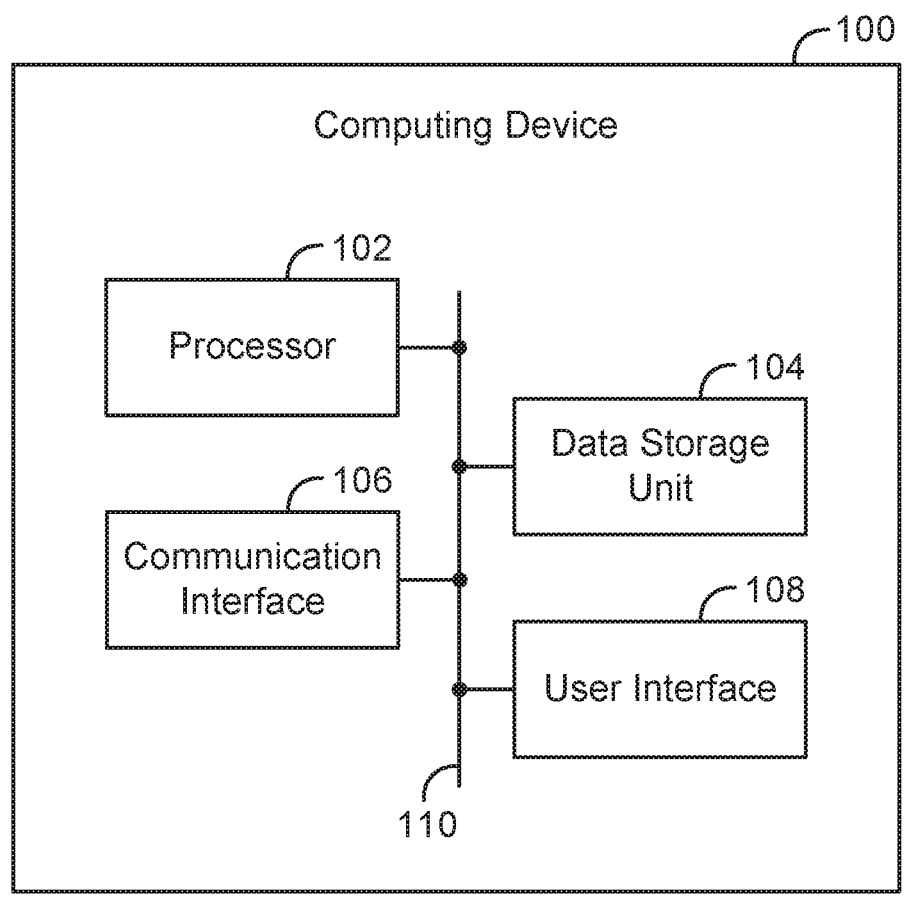
FIG. 1 is a simplified block diagram of an example computing device.

An operator of a vehicle, whether human or automated, can control the vehicle based on actions of, or output by, other vehicles in the environment. For instance, an operator can determine that another vehicle is turning based on a perceived turn signal of the other vehicle, or can determine that the other vehicle is stopping based on a perceived brake light of the other vehicle, and can control the vehicle accordingly.

In a traffic environment, the vehicle operator can make driving decisions based in large part on perceived brake lights in front of them, which can indirectly indicate an obstruction ahead. For example, an operator of a following vehicle can strive to maintain a safe distance behind a leading vehicle in the environment, and, upon perceiving brake lights directly ahead, can cause the following vehicle to engage its own brakes to continue maintaining the safe distance. In another example, the operator can perceive several sets of brake lights ahead at the same time, and can responsively determine a need to proceed cautiously.

In some instances, brake lights might not engage quickly enough to allow following vehicles to brake in a timely fashion. For instance, a human operator of a vehicle can only engage the brakes, and thus the brake lights of the vehicle, within a human reaction time. A human operator can also be prone to lapses in concentration, and thus might not perceive an obstruction ahead even if it exists. In other examples, not engaging the brakes, and thus the brake lights, can be intentional. For instance, the operator can swerve the vehicle or allow the vehicle to coast to a halt rather than braking to avoid an obstruction. In yet other examples, brake lights might not engage due to a mechanical failure in the vehicle, or environmental conditions can make it difficult for operators of following vehicles to perceive the brake lights. Such situations where the brake lights are not engaged or where they are difficult to perceive can make it difficult for an operator of a following vehicle to make appropriate driving decisions.

However, features of the present disclosure can help to address this issue and to provide an improvement to the relevant technical field. These features will now be described.

Automated event detection by a computing device can allow a vehicle to automatically operate a brake light and thereby alert operators of other vehicles of potential obstructions ahead. Such automated event detection can include the computing system determining that a leading vehicle has slowed without necessarily detecting that the leading vehicle has engaged its brake lights. For instance, as a leading vehicle slows down from braking, momentum of the chassis can cause the rear bumper of the leading vehicle to rise. Systems and methods are described below that allow the computing system to determine that the leading vehicle is slowing down by determining a change in height of the rear bumper; and responsively causing the brake light to activate.

A computing system associated with a following vehicle can include one or more sensor devices, a controller, and a light source. The one or more sensor devices can include one or more of an image capture device, a radar device, a light ranging and detection (LIDAR) device, or any other proximity-detecting device. The one or more sensor devices can provide sensor data to the controller that is indicative of an environment of the following vehicle. The controller can, in turn, determine that a leading vehicle exists in front of the following vehicle, and determine that the leading vehicle is slowing down based on the provided sensor data.

To determine that the leading vehicle is slowing down, the controller can evaluate the sensor data at different times. For instance, the controller can determine, at a first time, a first height of a rear bumper of a leading vehicle relative to a reference height. The reference height can be based on a road surface or on a visible portion of a rear tire of the leading vehicle, for example. The computing system can also determine at a second time that is later than the first time, a second height of the bumper relative to the reference height. The computing system can then compare the determined first height and the second determined height to determine whether they lack a threshold extent of similarity based on an established tolerance level. For instance, the controller can determine that the two determined heights differ by more than two inches. In so doing, the computing system can determine that the leading vehicle has slowed enough to justify engaging a brake light.

Causing the brake light to operate can simply include causing a light source to emit light, but other ways of controlling the brake light to operate are possible as well. For instance, the brake light can be operated in a manner that is dependent on the determined difference between the determined first height and second height. Thus, as the difference increases, the controller can cause the light source to emit light at a greater intensity.

The computing system can additionally base its control of a brake light on how suddenly the leading vehicle slows down. For instance, the controller can take into account a difference between the first time at which the first height is determined and the second time at which the second time is determined. Where the determined first and second heights lack the threshold extent of similarity, the first time and the second time being similar can indicate a sudden slowing of the leading vehicle. The controller can cause specific brake light operations where such sudden slowing is detected. For instance, the controller can automatically engage brakes of the following vehicle, engage an anti-lock braking system (ABS) of the vehicle, or cause the light source to operate according to an emergency lighting pattern.

II. Example Architecture

A. Computing Device

FIG. 1 is a simplified block diagram of an example computing device 100. The computing device 100 can be configured to perform and/or can perform one or more acts and/or functions, such as those described in this disclosure. The computing device 100 can include various components, such as a processor 102, a data storage unit 104, a communication interface 106, and/or a user interface 108. Each of these components can be connected to each other via a connection mechanism 110.

In this disclosure, the term "connection mechanism" means a mechanism that facilitates communication between two or more components, devices, systems, or other entities. A connection mechanism can be a relatively simple mechanism, such as a cable or system bus (e.g., a controller area network), or a relatively complex mechanism, such as a packet-based communication network (e.g., the Internet). In some instances, a connection mechanism can include a non-tangible medium (e.g., in the case where the connection is wireless).

The processor 102 can include a general-purpose processor (e.g., a microprocessor) and/or a special-purpose processor (e.g., a digital signal processor (DSP)). The processor 102 can execute program instructions included in the data storage unit 104 as discussed below.

The data storage unit 104 can include one or more volatile, non-volatile, removable, and/or non-removable storage components, such as magnetic, optical, and/or flash storage, and/or can be integrated in whole or in part with the processor 102. Further, the data storage unit 104 can take the form of a non-transitory computer-readable storage medium, having stored thereon program instructions (e.g., compiled or non-compiled program logic and/or machine code) that, upon execution by the processor 102, cause the computing device 100 to perform one or more acts and/or functions, such as those described in this disclosure. These program instructions can define, and/or be part of, a discrete software application. In some instances, the computing device 100 can execute program instructions in response to receiving an input, such as an input received via the communication interface 106 and/or the user interface 108. The data storage unit 104 can also store other types of data, such as those types described in this disclosure.

The communication interface 106 can allow the computing device 100 to connect with and/or communicate with another entity according to one or more protocols. In one example, the communication interface 106 can be a wired interface, such as an Ethernet interface. In another example, the communication interface 106 can be a wireless interface, such as a cellular or WI-FI interface. In this disclosure, a connection can be a direct connection or an indirect connection, the latter being a connection that passes through and/or traverses one or more entities, such as a router, switcher, or other network device. Likewise, in this disclosure, a transmission can be a direct transmission or an indirect transmission.

The user interface 108 can include hardware and/or software components that facilitate interaction between the computing device 100 and a user of the computing device 100, if applicable. As such, the user interface 108 can include input components such as a keyboard, a keypad, a mouse, a touch-sensitive panel, and/or a microphone, and/or output components such as a display device (which, for example, can be combined with a touch-sensitive panel), a sound speaker, and/or a haptic feedback system.

The computing device 100 can take various forms, such as a workstation terminal, a desktop computer, a laptop, a tablet, and/or a mobile phone.

B. Brake Light Operation System

Figure 2:
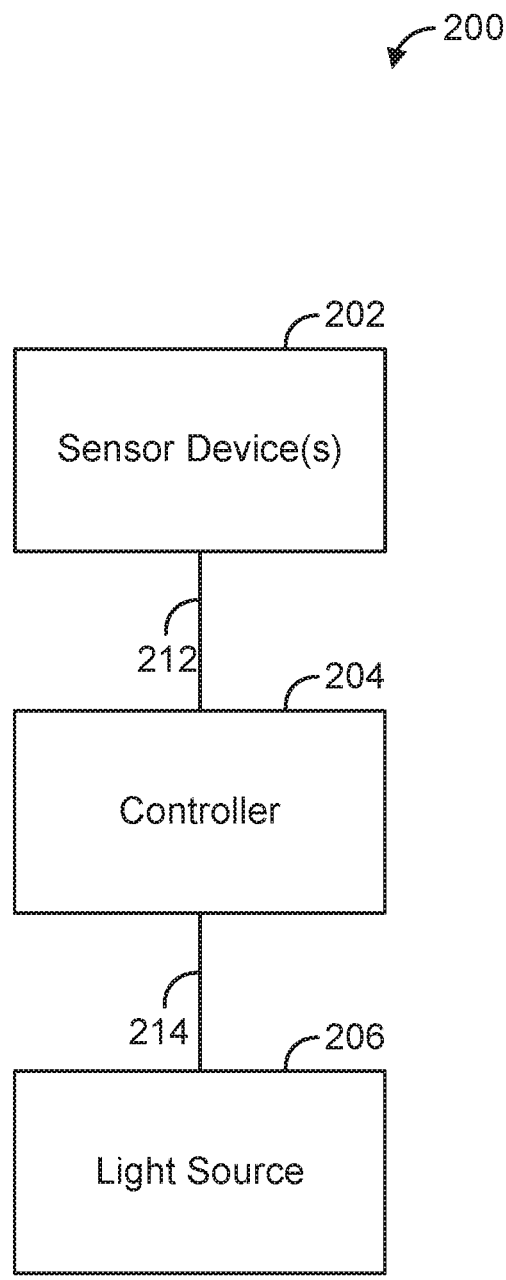
FIG. 2 is a simplified block diagram of an example brake light operation system.

FIG. 2 is a simplified block diagram of an example brake light operation system 200. The brake light operation system 200 can perform various acts and/or functions, and can be implemented as a computing system. In this disclosure, the term "computing system" means a system that includes at least one computing device. In some instances, a computing system can include one or more other computing systems.

The brake light operation system 200 can include various components, such as one or more sensor devices 202, a controller 204, and a light source 206, each of which can be implemented as a computing system.

The brake light operation system 200 can also include a connection mechanism 212, which connects the one or more sensor devices 202 to controller 204, and a connection mechanism 214, which connects the controller to the light source 206.

The one or more sensor devices 202 can take various forms. For example, the one or more sensor devices 202 can include an image capture device, a LIDAR device, a radar device, any other type of proximity-sensing device, or any combination thereof The controller 204 can take various forms as well. For example, the controller can be a computing device, such as the computing device 100 described above, that is included within a vehicle.

The light source 206 can also take various forms. For example, the light source can be a brake light that includes one or more bulbs that emit light, a rapidly flashing raster display, an array of light emitting diodes, an infrared light emitter, or any combination thereof.

III. Example Operations

The brake light operation system 200 and/or components thereof can perform various acts and/or functions. Examples of these and related features will now be described.

One or more sensor devices 202 can be mounted on a first vehicle (hereinafter a "following vehicle") and can obtain sensor data indicative of an environment of the following vehicle. The one or more sensor devices 202 can include an image capture device, radar device, LIDAR device, and/or other proximity-detecting sensors.

In some examples, the one or more sensor devices 202 can include an image capture device, such as a camera. The image capture device can periodically capture images of a scene in front of the following vehicle. The images of the scene can include information indicative of a road surface within the environment, a second vehicle disposed in from of the following vehicle (hereinafter a "leading vehicle") within the environment, and a rear bumper of the leading vehicle. In this content, a leading vehicle is "in front of" a following vehicle when a front end of the following vehicle is oriented towards a rear end of the leading vehicle.

In some examples, the one or more sensor devices 202 can additionally or alternatively include a radar device. The radar device can periodically send outgoing signals and periodically receive reflected signals. The received reflected signals can include information indicative of a proximity between the following vehicle and other objects within the environment, including a leading vehicle.

In some examples, the one or more sensor devices 202 can additionally or alternatively include a LIDAR device. The LIDAR device can periodically send light signals and periodically receive reflected light signals. The received reflected light signals can include information indicative of a three-dimensional (3D) representation of the environment. This 3D representation can take the form of point cloud data, for instance.

The controller 204 can receive sensor data from the one or more sensor devices 202, and use the sensor data to perform a series of operations that allow the controller 204 to detect whether the leading vehicle has slowed a threshold amount. Upon detecting that the leading vehicle has slowed the threshold amount, the controller 204 can control the following vehicle in a number of ways. Examples of these and related features will now be described.

A. Example Event Detection Operations

The controller 204 can determine the presence of a leading vehicle in front of the following vehicle based on sensor data received from the one or more sensor devices 202. The sensor data can include an image from an image capture device, reflected signals from a radar device, point cloud data from a LIDAR device, and/or other proximity-related data from other proximity-detecting sensors. The controller 204 can detect the presence of the leading vehicle by, for example, comparing the received sensor data to predetermined thresholds and/or stored representations of leading vehicles.

In examples where the one or more sensor devices 202 include an image capture device, the controller 204 can compare a section of an image captured by the image capture device to images stored in a database of leading vehicles to determine a correlation between the section of the captured image and one or more of the stored images. The controller can use the determined correlation to detect whether a leading vehicle is disposed in front of the following vehicle.

In other examples where the one or more sensor devices 202 include a radar device, the controller 204 can determine a time between sending outgoing signals and receiving reflected signals by the radar device, and can further determine a total power of the received reflected signals. The determined time and determined total power can then be compared to predetermined thresholds that indicate a leading vehicle is disposed in front of the following vehicle.

In still other examples where the one or more sensor devices 202 include a LIDAR device, the controller 204 can align a subset of point cloud data received by the LIDAR device to stored 3D point information indicative of a leading vehicle. The controller can align the received data to the stored information using an iterative closest point (ICP) algorithm, or any similar algorithm, and can thereafter determine a correlation between aligned received data and stored information.

In other examples, the controller 204 might not use sensor data from the one or more sensor device 202 to determine the presence of the leading vehicle. In some examples, the controller 204 can receive an indication of the presence of the leading vehicle by way of another entity in the environment, such as a remote traffic monitor, or from the leading vehicle itself. Other ways of determining that a leading vehicle is disposed in front of the following vehicle are possible as well.

The controller 204 can determine the presence of a bumper of the leading vehicle in much the same way described above with regard to determining the presence of a leading vehicle. That is, the controller 204 can use received sensor data from the one or more sensor devices 202 to identify a bumper of the leading vehicle. As described above, the controller 204 can use predetermined thresholds, correlations, or other data processing to identify the bumper. The controller 204 can determine the presence of the bumper periodically.

Figure 3A:
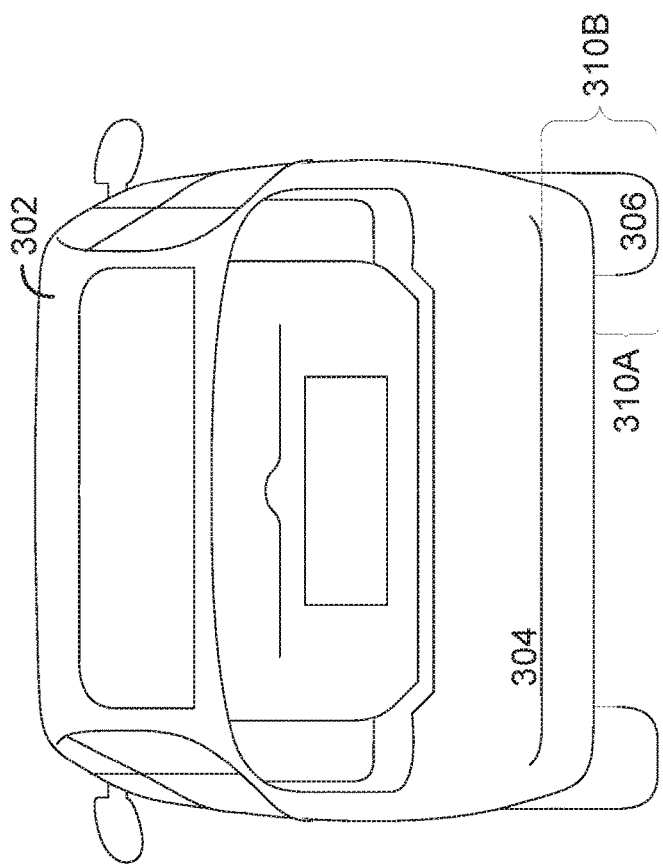
FIG. 3A is a simplified depiction of an example leading vehicle at a first time.
Figure 3B:
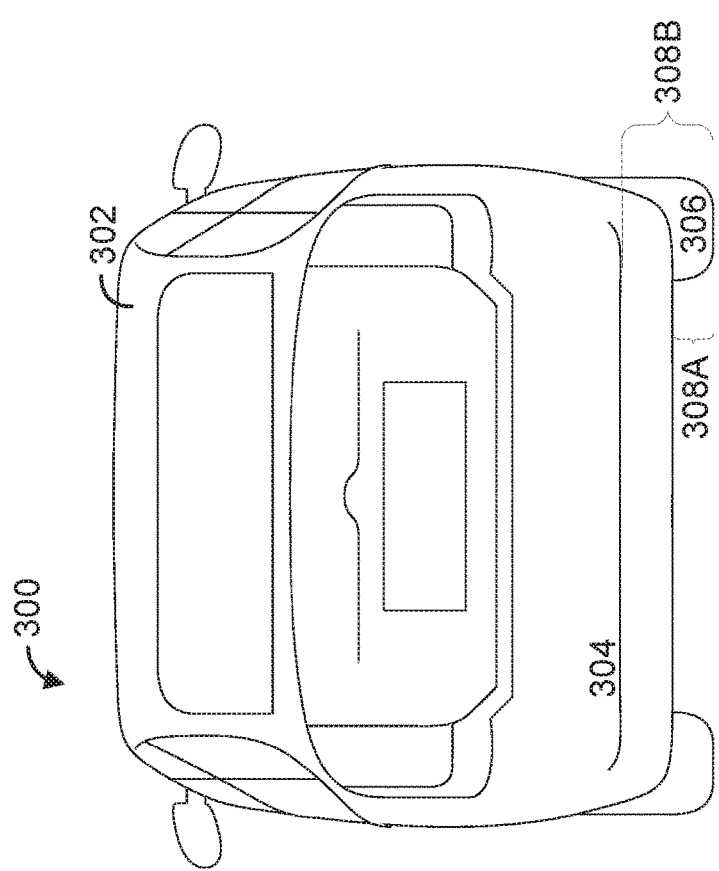
FIG. 3B is a simplified depiction of the example leading vehicle at a second time.

The controller 204 can also periodically determine a height of a rear bumper of the leading vehicle. FIGS. 3A and 3B provide simplified depictions of a leading vehicle from a point of view of controller 204. FIG. 3A is a simplified depiction of a leading vehicle at a first time. FIG. 3B is a simplified depiction of a leading vehicle at a second time. It should be understood that these simplified depictions can represent portions of sensor data received from the one or more sensor devices 202, and that such data can include other portions of a scene disposed in front of the following vehicle, including portions that correspond to other leading vehicles.

FIG. 3A depicts a computing system 300 that includes leading vehicle 302 having a rear bumper 304 and a tire 306. Determining a height of the bumper 304 can be performed relative to a determined reference height. The reference height can be defined and/or determined in several ways. For instance, the reference height can be a height of a plane defined by a surface of a road on which the following and leading vehicles are disposed. Though not depicted in FIG. 3A, it should be understood that the sensor data can include an indication of the road surface, and that the controller 204 can determine a plane defined by the indication of the road surface. For instance, where the sensor data includes an image, image processing can be used to determine lane indications that indicate a road surface and define a plane, which is associated with a height. For instance, for purposes of example, the planar height of the road surface can be said to be zero inches. However, since the bumper height is determined relative to the reference height, the reference height can be any predetermined amount.

In another example, the reference height can be determined based on a portion of a tire of the leading vehicle. For instance, the controller 204 can identify the tire 306 from the received sensor data, and the height of the bumper 304 can be determined relative to the portion of the tire 306. The portion of the tire 306 can be for example, a visible portion of the tire 306, such as the portion corresponding to height 308A in FIG. 3A. Other ways of determining the reference height are possible as well.

The controller 204 can determine that the leading vehicle is slowing based on a comparison of bumper heights at different times. For instance, the controller 204 can compare a first bumper height determined at a first time, as depicted in FIG. 3A, to a second bumper height determined at a second time that is later than the first time, as depicted in FIG. 3B.

Figure 3C:
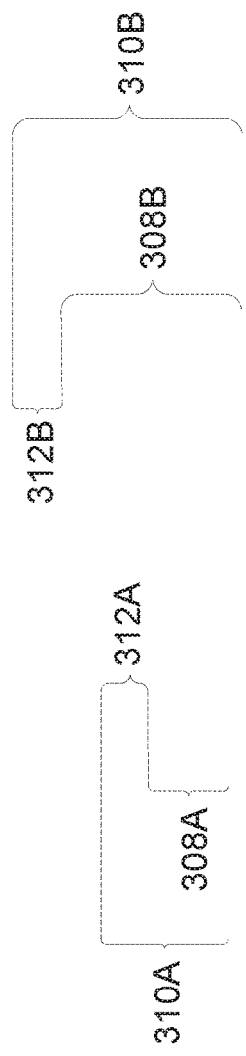
FIG. 3C is a simplified depiction of a determined height difference of a rear bumper of the example leading vehicle.

FIGS. 3A and 3B each depict two ways of determining a bumper height. Heights 308A and 310A respectively illustrate a relative bumper height that uses a bottom edge of the bumper 304, while heights 308B and 310B respectively illustrate a relative bumper height that uses a different edge feature of the bumper 304. FIG. 3C shows, that, though different features of the bumper 304 (i.e. the bottom edge and the different edge feature) are used to determine the relative bumper height, the compared heights, 312A and 312B, are substantially identical. In either example, the reference height can be based on a planar height of a road surface, on a portion of tire 306, or on some other reference height.

The controller 204 can make a determination that the determined first height and the determined second height lack a threshold extent of similarity based on an established tolerance level. For example, the determined difference between the first and second height can be compared to a threshold bumper height difference. If the difference meets or exceeds the threshold bumper height difference, the controller can perform one of the operations described below.

The threshold height difference can be based on a number of factors. For instance, the threshold height difference can be a percentage of a baseline height of the leading vehicle. The baseline height can be an average height of the leading vehicle determined over time. So, before determining the difference between the first bumper height and the second bumper height, the controller 204 can determine several different bumper heights, and establish a baseline bumper height based on those determined bumper heights.

In other examples, the tolerance level can additionally or alternatively be based on an average difference between determined bumper heights. For instance, the controller 204 can periodically determine a bumper height of the leading vehicle, and can, for each determination, update the average bumper height difference. The controller 204 can, for example, set a threshold bumper height difference by multiplying the average bumper height difference by a predetermined constant value.

In still other examples, the tolerance level can additionally or alternatively be based on a type of leading vehicle. For instance, the controller 204 can use image processing of sensor data obtained by an image capture device to determine that the leading vehicle is a sedan, SUV, semi-truck, etc. Each vehicle type can be associated with a range of weights and/or stopping distances, and the controller 204 can set the tolerance level based on a weight and/or stopping distance associated with the leading vehicle. In some examples, the controller 204 can match a reference image captured by the image capture device with a known make and model. The known make and model can similarly be associated with a weight and/or stopping distance, which can form the basis for the tolerance level. Other characteristics of a vehicle type can be used to determine the tolerance level as well.

The controller 204 can also make a determination that the first time and the second time have a threshold extent of similarity based on a predefined tolerance level. For instance, in the example depicted in FIGS. 3A and 3B, a difference between the first time and the second time can be within a threshold time range. Thus, in these examples, the controller 204 can determine that the bumper height of the leading vehicle has raised by a threshold amount within a threshold amount of time. Such a determination can allow the controller 204 to determine that the leading vehicle is making a sudden stop, and to control the following vehicle accordingly.

B. Example Brake Light Control Operations

Responsive at least to making a determination that the determined first height and the determined second height lack the threshold extent of similarity based on the established tolerance level, the controller 204 can cause the light source 206 to operate. For instance, the controller 204 can cause the light source 206 to emit light. That is, the controller 204 can cause a brake light of the following vehicle to turn on. In some examples, causing the light source 206 to emit light can be performed independently of engaging the brakes of the following vehicle. However, other operations are possible. Examples of these and related features will now be described.

In some examples, causing the light source to operate can include causing the light source to operate in a manner that is dependent on the determined difference between the determined first height and the determined second height. In other words, controller 204 can determine an extent to which the determined first height and the determined second height lack a threshold extent of similarity, and control the light source 206 based on the extent to which the heights lack similarity. For instance, where the bumper height is twice the threshold bumper height difference, the controller 204 can cause the light source to emit light twice as brightly as a default brightness level associated with the threshold bumper height difference.

In other examples, the controller 204 can cause particular LEDs of a raster display to light as the bumper height of the leading vehicle approaches a maximum bumper height difference threshold. For instance, the LEDs can form a dial, more LEDs of the dial can light as the bumper height of the leading vehicle rises, and all of the LEDs of the dial can light if the maximum bumper height difference threshold is reached. In still other examples, the controller 204 can cause infrared light emitters in the brake light to operate such that information can be conveyed to a third vehicle disposed behind the following vehicle without alerting a human operator of the third vehicle. The information can convey the bumper height difference, or associated information, to the third vehicle.

In further examples, the controller 204 can determine that the maximum bumper height difference has been reached, and can, responsive to the determination, cause the light source 206 to operate according to an emergency indication lighting pattern. This emergency mode of operation can endure for a predetermined length of time, after which the vehicle can revert to a normal mode of operation.

In some examples, the controller 204 can, responsive to determining that the first height and the determined second height lack a threshold extent of similarity, cause the following vehicle to engage its brakes. For instance, the controller 204 can, responsive to determining that the maximum bumper height difference has been reached, activate an anti-lock braking system of the following vehicle. In such examples, the controller 204 can further activate a sway control system of the following vehicle.

C. Other Example Control Operations

In some scenarios, the controller 204 can control the light source 206 based on a determined status of the following vehicle. For instance, the controller 204 can determine sudden slowing of the following vehicle, and perform operations based on the determined slowing. Examples of these and related features will now be described.

In one example, the controller 204 can determine that an ABS of the following vehicle is engaged, which can suggest that the following vehicle braked suddenly. Responsive to determining that the ABS was engaged, the controller 204 can cause the light source 206 to operate in a manner that is different from typical brake light operation. For instance, the controller 204 can cause the light source 206 to emit light at a higher than normal intensity. Alternatively, in the case where the light source 206 includes a left brake light and a right brake light, the two lights can flash in an alternating fashion.

In another example, the controller 204 can operate to provide an audio/visual cue to an operator of the following vehicle. The audio/visual cue can be provided via a dashboard graphical user interface, for instance, and can provide an indication that the ABS has been engaged, or that an emergency condition of the following vehicle exists. The cue can also be provided via a speaker output that informs the operator that the ABS is engaged, or that an emergency condition exists.

In other examples, the controller 204 can perform vehicle control operations responsive to determining sudden slowing of the following vehicle, such as by determining that the ABS is engaged. For instance, the controller 204 can activate a vehicle sway control scheme in response to determining that the ABS is engaged. The vehicle sway control scheme can, for example, use sensor data from an inertial measurement unit (IMU) to coordinate braking of individual tires at particular times to prevent the following vehicle from rolling.

As described above, it should be understood that the components of the brake light operation system 200 can be included within, or operable on, a computing system. Thus, as described below, a computing system can be said to perform the operations described above with regard to, for example, the controller 204.

D. Example Methods for Brake Light Control

Figure 4:
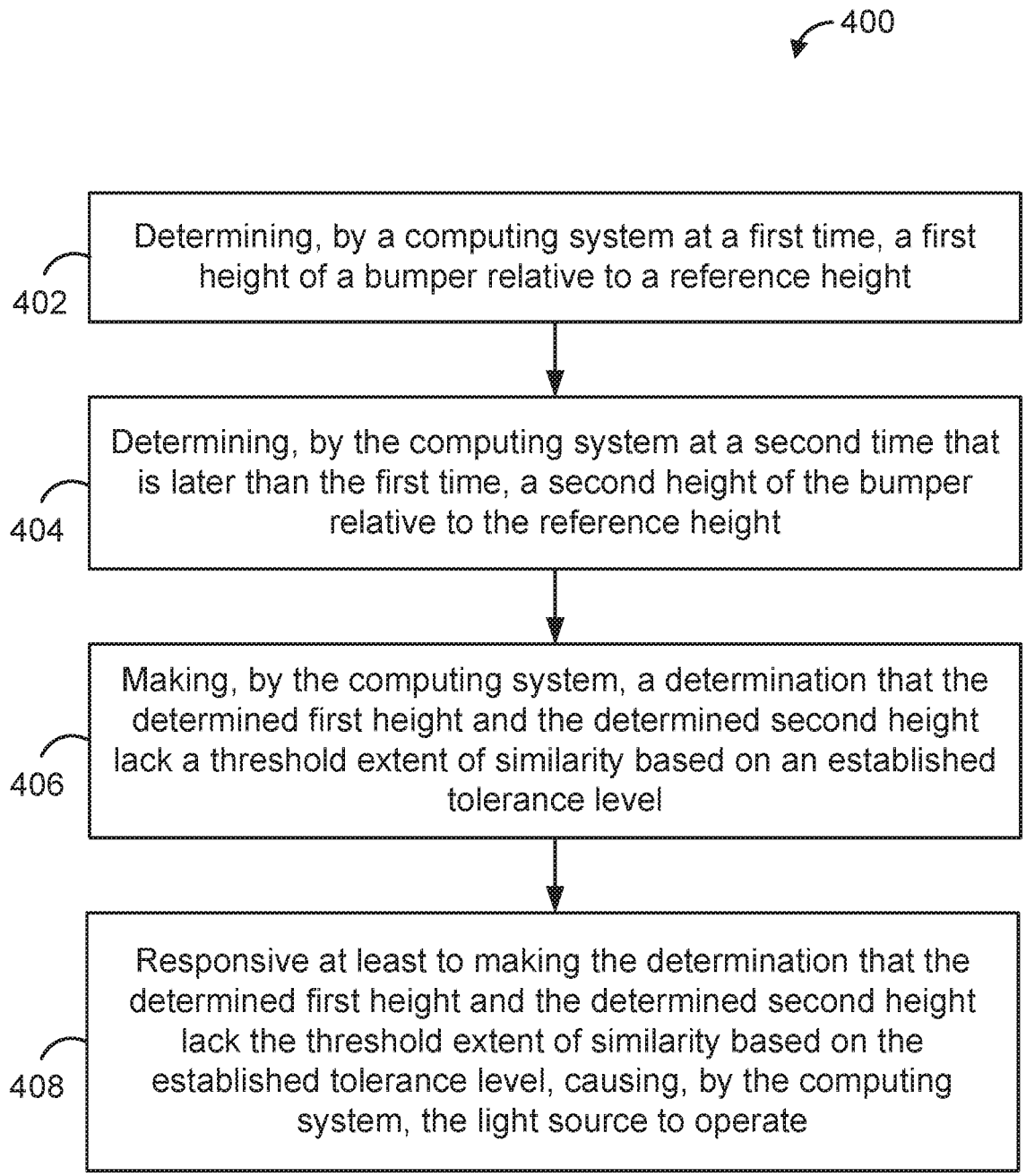
FIG. 4 is a flow chart of an example method.

FIG. 4 is a flow chart illustrating an example method 400. The method 400 can be for use in connection with a following vehicle and a leading vehicle, wherein the following vehicle includes a front end, a rear end, a computing system, and a light source disposed at the rear end, wherein the leading vehicle includes a rear end and a bumper disposed at the rear end of the leading vehicle, and wherein the front end of the following vehicle is oriented towards the rear end of the leading vehicle.

At block 402, the method 400 can include determining, by the computing system at a first time, a first height of the bumper relative to a reference height.

In some examples, the reference height is a height of a plane defined by a surface of a road on which the leading and following vehicles are disposed. In other examples, the leading vehicle further comprises a tire, wherein the reference height is a height of a portion of the tire. In additional examples, the computing system includes an image capture device, wherein determining the first height of the bumper relative to the reference height includes using the image capture device to facilitate determining the first height of the bumper relative to the reference height. In further examples, the computing system includes a radar device or a LIDAR device, wherein determining the first height of the bumper relative to the reference height comprises using the radar device or LIDAR device to facilitate determining the first height of the bumper relative to the reference height.

At block 404, the method 400 can include determining, by the computing system at a second time that is later than the first time, a second height of the bumper relative to the reference height.

At block 406, the method 400 can include making, by the computing system, a determination that the determined first height and the determined second height lack a threshold extent of similarity based on an established tolerance level.

In some examples, the method 400 can further include identifying, by the computing system, a type of the leading vehicle, and using, by the computing system, the identified type of the leading vehicle to establish the tolerance level. In such examples, the computing system can include an image capture device, and identifying the type of the leading vehicle can include (i) using the image capture device to capture an image of the leading vehicle, and (ii) matching the captured image to a reference image of a vehicle with a known make and/or model.

At block 408, the method 400 can include, responsive at least to making the determination that the determined first height and the determined second height lack the threshold extent of similarity based on the established tolerance level, causing, by the computing system, a light source to operate. In some examples, causing the light source to operate can include causing the light source to emit light.

In some examples, the determination of the method 400 can be a first determination. In such examples, the method 400 can further include making, by the computing system, a second determination that the first time and the second time have a threshold extent of similarity based on a predefined tolerance level, wherein responsive at least to making the first determination, causing, by the computing system, the light source to operate includes, responsive at least to making the first determination and the second determination, causing, by the computing system, the light source to operate.

In some examples, the method 400 can include determining, by the computing system, a difference between the determined first height and the determined second height, wherein causing the light source to operate includes causing the light source to operate in a manner that is dependent on the determined difference between the determined first height and the determined second height.

IV. Example Variations

Although some of the acts and/or functions described in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more examples of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

We claim:

1. A method for use in connection with a following vehicle and a leading vehicle, wherein the following vehicle comprises a front end, a rear end, a computing system, and a light source disposed at the rear end of the following vehicle, wherein the leading vehicle comprises a rear end and a bumper disposed at the rear end of the leading vehicle, and wherein the front end of the following vehicle is oriented towards the rear end of the leading vehicle, the method comprising:

determining, by the computing system at a first time, a first height of an edge feature of the bumper, wherein the first height is defined by a vertical component of a distance between the edge feature as positioned at the first time and a reference height;

determining, by the computing system at a second time that is later than the first time, a second height of the edge feature of the bumper, wherein the second height is defined by a vertical component of a distance between the edge feature as positioned at the second time and the reference height;

making, by the computing system, a determination that the determined first height and the determined second height lack a threshold extent of similarity based on an established tolerance level; and causing, by the computing system, responsive at least to making the determination that the determined first height and the determined second height lack the threshold extent of similarity based on the established tolerance level, the light source of the following vehicle to emit light.

2. The method of claim 1, wherein the reference height is a height of a plane defined by a surface of a road on which the leading and following vehicles are disposed.

3. The method of claim 1, wherein the leading vehicle further comprises a tire, wherein the reference height is a height of a portion of the tire.

4. The method of claim 1, wherein the computing system comprises an image capture device, and wherein determining the first height of the edge feature comprises using the image capture device to facilitate determining the first height of the edge feature.

5. The method of claim 1, wherein the computing system comprises a radar device or a light detection and ranging (LIDAR) device, and wherein determining the first height of edge feature comprises using the radar device or the LIDAR device to facilitate determining the first height of the edge feature relative to the reference height.

6. The method of claim 1, wherein the edge feature is a portion of an edge of a bumper disposed at the rear end of the leading vehicle.

7. The method of claim 1, wherein the determination is a first determination, the method further comprising:

making, by the computing system, a second determination that the first time and the second time have a threshold extent of similarity based on a predefined tolerance level, wherein causing the light source to emit light comprises causing the light source to emit light responsive at least to making the first determination and the second determination, and wherein responsive at least to making the first determination, causing, by the computing system, the light source to emit light comprises, responsive at least to making the first determination and the second determination, causing, by the computing system, the light source to emit light.

8. The method of claim 1, further comprising:

identifying, by the computing system, a type of the leading vehicle; and using, by the computing system, the identified type of the leading vehicle to establish the tolerance level.

9. The method of claim 8, wherein the computing system comprises an image capture device, and wherein identifying the type of the leading vehicle comprises (i) using the image capture device to capture an image of the leading vehicle, and (ii) matching the captured image to a reference image of a vehicle with a known make and/or model.

10. The method of claim 1, further comprising:
  determining, by the computing system, a difference between the determined first height and the determined second height,
  wherein causing the light source to emit light comprises causing the light source to emit light in a manner that is dependent on the determined difference between the determined first height and the determined second height.

11. A non-transitory computer-readable medium having stored thereon program instructions that, when executed by a processor, cause performance of a set of acts for use in connection with a following vehicle and a leading vehicle, wherein the following vehicle comprises a front end, a rear end, a computing system, and a light source disposed at the rear end of the following vehicle, wherein the leading vehicle comprises a rear end and a bumper disposed at the rear end of the leading vehicle, and wherein the front end of the following vehicle is oriented towards the rear end of the leading vehicle, the set of acts comprising:
  determining, by the computing system at a first time, a first height of an edge feature of the bumper, wherein the first height is defined by a vertical component of a distance between the edge feature as positioned at the first time and a reference height;
  determining, by the computing system at a second time that is later than the first time, a second height of the edge feature of the bumper, wherein the second height is defined by a vertical component of a distance between the edge feature as positioned at the second time and the reference height;
  making, by the computing system, a determination that the determined first height and the determined second height lack a threshold extent of similarity based on an established tolerance level; and
  causing, by the computing system, responsive at least to making the determination that the determined first height and the determined second height lack the threshold extent of similarity based on the established tolerance level, the light source of the following vehicle to emit light.

12. The non-transitory computer-readable medium of claim 11, wherein the reference height is a height of a plane defined by a surface of a road on which the leading and following vehicles are disposed.

13. The non-transitory computer-readable medium of claim 11, wherein the edge feature is a portion of an edge of a bumper disposed at the rear end of the leading vehicle.

14. A method for use in connection with a following vehicle and a leading vehicle, wherein the following vehicle comprises a front end, a rear end, a computing system, and one or more brakes, wherein the leading vehicle comprises a rear end and a bumper disposed at the rear end of the leading vehicle, and wherein the front end of the following vehicle is oriented towards the rear end of the leading vehicle, the method comprising:
  determining, by the computing system at a first time, a first height of an edge feature of the bumper, wherein the first height is defined by a vertical component of a distance between the edge feature as positioned at the first time and a reference height;
  determining, by the computing system at a second time that is later than the first time, a second height of the edge feature of the bumper, wherein the second height is defined by a vertical component of a distance between the edge feature as positioned at the second time and the reference height;
  making, by the computing system, a determination that the determined first height and the determined second height lack a threshold extent of similarity based on an established tolerance level; and
  causing, by the computing system, responsive at least to making the determination that the determined first height and the determined second height lack the threshold extent of similarity based on the established tolerance level, the one or more brakes of the following vehicle to engage.

15. The method of claim 14, wherein the reference height is a height of a plane defined by a surface of a road on which the leading and following vehicles are disposed.

16. The method of claim 14, wherein the edge feature is a portion of an edge of a bumper disposed at the rear end of the leading vehicle.

17. The method of claim 14, wherein causing the one or more brakes to engage comprises activating an anti-lock braking system of the following vehicle.

18. The method of claim 14, wherein causing the one or more brakes to engage comprises activating a sway control system of the following vehicle.

19. The method of claim 14, wherein the determination is a first determination, the method further comprising:
  making, by the computing system, a second determination that the first time and the second time have a threshold extent of similarity based on a predefined tolerance level,
  wherein causing the light source to emit light comprises causing the light source to emit light responsive at least to making the first determination and the second determination.

20. The method of claim 14, wherein the computing system comprises an image capture device, the method further comprising:
  identifying, by the computing system, a type of the leading vehicle, wherein identifying the type of the leading vehicle comprises
    (i) using the image capture device to capture an image of the leading vehicle, and
    (ii) matching the captured image to a reference image of a vehicle with a known make and/or model; and
  using, by the computing system, the identified type of the leading vehicle to establish the tolerance level.

* * * * *